United States Patent [19]
Stacy

[11] 3,851,163
[45] Nov. 26, 1974

[54] PHOTOFLASH ASSEMBLY WITH SERIALLY ADVANCING PERCUSSIVE LAMPS

[75] Inventor: John C. Stacy, Watsontown, Pa.

[73] Assignee: GTE Sylvania Incorporated, Danvers, Mass.

[22] Filed: Nov. 21, 1973

[21] Appl. No.: 417,956

[52] U.S. Cl.................. 240/1.3, 354/142, 354/148, 431/92
[51] Int. Cl. ............................................ G03b 15/02
[58] Field of Search............ 240/1.3, 37.1; 95/11 L; 431/92, 93, 95; 354/126, 142, 148

[56] References Cited
UNITED STATES PATENTS

| | | | |
|---|---|---|---|
| 3,096,025 | 7/1963 | Prochnow............................ | 240/1.3 |
| 3,238,749 | 3/1966 | Reiber et al. ...................... | 240/1.3 X |
| 3,348,188 | 10/1967 | Wood ..................................... | 240/1.3 X |
| 3,452,660 | 7/1969 | Schultz et al. .................... | 240/1.3 X |
| 3,584,554 | 6/1971 | Hochreiter.......................... | 95/11 L |
| 3,719,126 | 3/1973 | Engelsmann et al. ............... | 95/11 L |
| 3,727,040 | 4/1973 | Armstrong et al................... | 240/1.3 |
| 3,751,656 | 8/1973 | Buckler et al. ...................... | 240/1.3 |

Primary Examiner—Fred L. Braun
Attorney, Agent, or Firm—Edward J. Coleman

[57] ABSTRACT

A photoflash magazine comprising a closed container within which is mounted a sprocket driven endless belt carrying a plurality of percussively-ignitable flashlamps and associated reflector segments. A window and stationary reflector segment are located in the front face of the container, and when the magazine is mounted on a camera, the belt is adapted to be driven by the camera film advance mechanism for sequentially moving the flashlamps into a firing position in alignment with the window. The firing position and window are offset from the camera lens sufficient to reduce "red-eye" effect, and a common preenergized striker is pivotally mounted near the firing position and held in a cocked condition by a latch accessible through an aperture in the magazine to be actuated for releasing the striker to fire a lamp at the firing position. A rotating cam or a spiral spring on the striker is used in combination with the latch to recock the striker each time the lamps are advanced subsequent to striker release.

18 Claims, 8 Drawing Figures

PHOTOFLASH ASSEMBLY WITH SERIALLY ADVANCING PERCUSSIVE LAMPS

BACKGROUND OF THE INVENTION

This invention relates to multilamp photoflash assemblies and, more particularly, to a magazine containing a plurality of percussively-ignitable flashlamps and associated reflector segments and a mechanism for serially advancing the flashlamps to a remote firing position having a common recockable striker.

The trend in photoflash devices has been toward the use of subminiature flashlamps (an envelope volume of less than 1 cubic centimeter) in compact, disposable, multilamp units to provide camera users with the advantages of greater convenience, compactness and portability. A currently popular flashlamp unit of this type is known generally in the trade as a flashcube, a specific embodiment of which is shown in U.S. Pat. No. 3,327,105, for example. The unit comprises a set of four flashlamps, each with its own reflector, mounted on a base and enclosed within a transparent cover, with each of the lamp-reflector assemblies facing a respective one of the four side walls of the cube. A spindle depends from the center of the flashcube base for operatively retaining the unit in a complementary receiving socket on a camera. In operation, the flashcube is sequentially rotated a quarter of a turn at a time, usually in response to each operation of the film advance mechanism of the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In the case of flashcubes employing electrically ignited lamps, a pair of lead-in wires pass through the lamp envelope to support therein a filament in combination with globules of ignition paste. When the flashcube is in the firing position, segments of the lead-in wires disposed outside the lamp envelope are securely engaged with electrical contacts in the camera socket, which in turn are connected by wires and a shutter actuated switch to the camera power source, usually a pair of dry cell batteries. When a photographer actuates the shutter release mechanism to "snap" a picture, he also, by the same operation, closes the electrical circuit from the batteries to the ignition system in the lamp to thereby flash the lamp. The timing of the ignition of the combustible material in the lamp is synchronized with the exposure of the film by actuating of the shutter release so that efficient utilization of the light from the flashlamp may be obtained.

A not infrequent problem, that has been faced by the average amateur photographer when using a battery operated flash system, however, has been failure of the lamp to fire due to weak batteries and/or dirt or corrosion on one or more of the electrical contacts in the system. To overcome this problem and provide improved flashlamp reliability, percussive-type flashlamps have been developed which may be mechanically fired without the need for batteries. As described in U.S. Pat. No. 3,535,063, for example, such flashlamps have a mechanical primer sealed in one end of the lamp in lieu of lead-in wires. This primer may comprise a metal tube extending from the lamp envelope and a charge of fulminating material on a wire supported in the tube. Operation of the percussive flashlamp is initiated by an impact onto the tube to cause deflagration of the fulminating material up through the tube to ignite the combustible disposed in the lamp envelope. The percussive-type lamps are also produced in subminiature envelope sizes and are employed in percussive flashcube units having respective preenergized striker springs associated with each lamp, as described in U.S. Pat. No. 3,597,604. The percussive flashcube is indexed into firing position similarly to the electrical flashcube; however, the flashlamp to be used is fired by the action of a member, associated with the camera shutter mechanism, moving up through the flashcube base to release the respective preenergized striker spring, whereby it sharply impacts against the primer tube of the lamp.

Another development in the field of multilamp flash units for providing additional convenience and flexibility is the provision of a flashlamp magazine comprising a container within which a movable strip or rotatable endless belt carrying a plurality of flashlamps is disposed. For example, the belt may be carried by sprocket wheels mechanically connected to and driven by the film advancing mechanism of the camera. The container includes a single reflector-backed firing position to which the flashlamps are sequentially advanced for successive ignition. Such magazines are particularly advantageous in that they may be designed to carry a sufficient number of flashlamps for use with an entire roll of film without the need for changing the flash unit. For example, a 12-lamp magazine may be employed for successive flash operation with a 12-exposure roll of film. The following U.S. Pat. Nos. are examples of previously described magazines of this type: 2,835,787; 3,176,482; 3,238,749; 3,263,068 and 3,452,660.

All of these patents, however, describe electrically energized flash magazines. Accordingly, although providing a number of advantages, these devices are still prone to the reliability problems associated with an electrical flash system, namely, ignition failures due to weak batteries and/or dirty or corroded electrical contacts. As discussed hereinbefore, such problems have previously been overcome in flashcube units by the use of percussive lamps with associated preenergized striker springs. There appears to be no prior art, however, with respect to the packaging and operation of percussive-type flashlamps in a magazine configuration wherein the lamps are serially advanced to a firing position within a fixed container.

In view of the current trend toward smaller size cameras, compact multilamp flash units such as the above discussed flash magazines, may also create photographic problems due to a substantial reduction in the lamp-to-lens distance. In the case of color film, the use of a flashlamp too near the lens when photographing human subjects may create an undesirable condition known as "redeye," in which red light from the flashlamp is reflected by the retinas of the subject's eyes onto the photographic film to show the pupils as red on the developed color print. The only practical method of eliminating "red-eye" is to provide adequate separation between the camera lens and the flashlamp. One approach toward correcting this problem on small cameras employing flashcubes is described in U.S. Pat. No. 3,348,188, wherein a "flash extender" attachment is provided for supporting the flashcube at an increased distance away from the associated camera. The more remote flash location thereby provided is also advantageous for black and white photography in that it can be used to produce limited shadows for highlights and depth effect purposes without excess contrast. The flash extender also has some obvious disadvantageous, however, in that it is a cumbersome piece of equipment (typically about 2½ inches long) relative to the compact camera and flashcube, and being an extra attachment, it is often forgotten by the amateur photographer.

SUMMARY OF THE INVENTION

Accordingly, it is an object of the present invention to provide an improved multiple photoflash lamp assembly which may be operated without an electrical energy source and which serially advances the lamps during the operation sequence.

A particular object of the invention is to provide a percussive flashlamp magazine wherein a plurality of lamps are sequentially advanced to a firing position within a closed container having a common recockable striker.

Another object is to provide a multilamp flash unit having improved means for reducing or eliminating the "red-eye" effect.

Briefly, these objects are attained, in accordance with the invention, by a photoflash assembly comprising a plurality of percussive flashlamps movably supported on a base member, means for controlling the path of travel of the flashlamps, and means for sequentially advancing the lamps to a firing position along said controlled path of travel. More particularly, the movable flashlamps are housed in a closed container having a window at a remote firing position, which, when mounted on a camera, is offset from the lens thereof by a distance sufficient to reduce the effect of "red-eye." A common preenergized striker means is provided for firing a lamp at the firing position upon release by latching means actuated through an aperture in the base. Means is also provided for cocking the striker after release, whereby the striker may be successively released and recocked to successively fire each new flashlamp sequentially advanced to the firing position.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
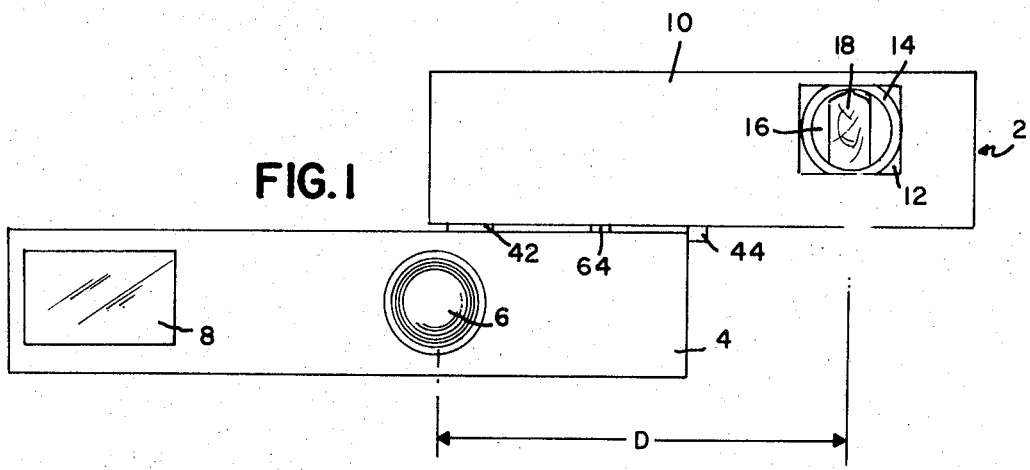
FIG. 1 is a front elevational view of a camera having a flash magazine according to the invention mounted thereon.

Referring to FIG. 1, a percussive flashlamp magazine 2 according to the invention is shown mounted on a camera 4 having a centrally disposed lens 6 and a viewfinder 8. The magazine 2 comprises a closed container 10 within which a plurality of percussive flashlamps are movably supported. The front face of the container 10 is provided with a window 12, of cellulose acetate for example, which defines a frame for the stationary segment 14 of a reflector. The stationary reflector 14 is secured to the inside of the front wall of the container and is aligned and in cooperative relationship with a movable reflector segment 16 within which each flashlamp 18 is located when the flashlamp is in firing position behind the window 12. As will be noted in FIG. 1, the window 12 and the firing position aligned therewith are preferably offset a predetermined distance from the camera lens 6 for eliminating or reducing the effect of "red-eye." A suitable compromise between compactness and the desired photographic effects may be achieved by locating the remote firing position and window 12 such that the horizontal distance D between the center of lens 6 and the center of a lamp 18 at the firing position is at least about 2½ inches.

Figure 2:
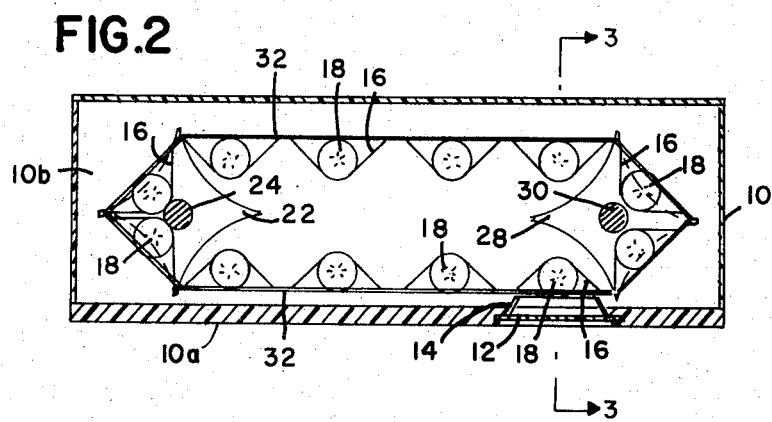
FIG. 2 is a plan view of the flash magazine of FIG. 1 with the upper sprocket wheels and the firing mechanism removed for clarity.
Figure 3:
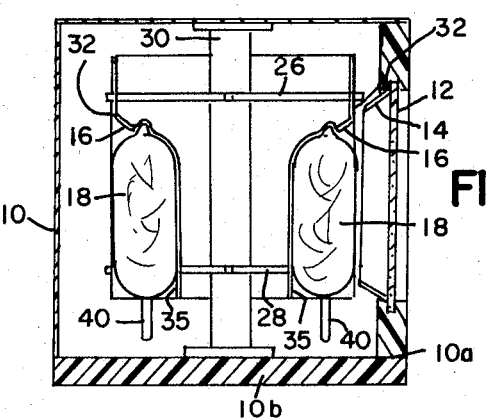
FIG. 3 is a sectional view taken on line 3—3 of FIG. 2.

As shown in FIG. 2, the container 10, which may comprise an assembly of molded plastic pieces, is provided with a front face 10a, within which the window 12 and stationary reflector segment 14 are disposed, and a base 10b upon which the flashlamps are movably supported. A pair of drive sprocket wheels 20 and 22 (FIG. 5) are rotatably mounted on base 10b by means of a shaft 24, and a pair of idler sprocket wheels 26 and 28 are rotatably mounted on the base 10b by means of a shaft 30 (FIGS. 2 and 3). Supported on the sprocket wheels is an endless belt 32 of flexible plastic material having perforations 34 (FIG. 4) along its top and bottom edges. These perforations are employed by the sprockets of wheels 20, 22, 26 and 28 for supporting and driving the belt over base 10b, whereby rotary motion of drive shaft 24 and wheels 20 and 22 is translated to a longitudinal motion of the belt 32. The belt 32 is also provided with a plurality of equally spaced cavities 35 within each of which a percussive flashlamp 18 is disposed, the lamps being secured to the belt by the shape of the cavity and/or by using a suitable adhesive. Each cavity 35 is provided with a reflective surface which constitutes the movable reflector segment 16 described above with respect to FIG. 1.

Figure 4:
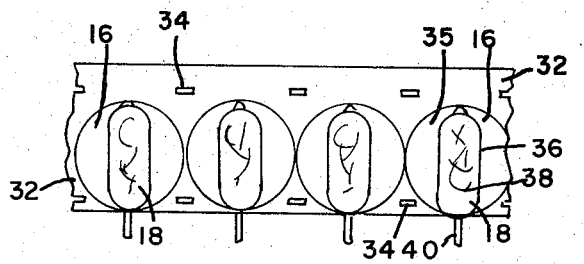
FIG. 4 is a fragmentary detail of the endless belt which carries a plurality of flashlamps within the magazine.

As shown particularly in FIG. 4, each lamp 18 comprises an hermetically sealed light-transmitting envelope 36 of tubular shape having a primer depending therefrom. A filling of combustible foil 38, such as zirconium, and a combustion-supporting gas, such as oxygen, are disposed in the envelope. The primer comprises a metal tube 40 coaxially depending from the envelope and within which a wire anvil and a charge of fulminating material are disposed. Each of the flashlamps is carried on the belt 32 in a substantially vertical position with the primer tube 40 projecting substantially below the lower edge of the belt, as shown in FIGS. 3 and 4. Further, belt 32 is supported by the sprocket wheels so as to carry the flashlamps 18 and primer tubes 40 above and spaced away from the upper surface of base 10b, as shown in FIG. 3.

To enable operative mounting of the magazine 2 on camera 4, the rotatable drive shaft, or spindle, 24 is provided with a depending portion in the form of a mounting post 42 (FIG. 5) which is shaped to be indexably receivable in a rotatable socket (not shown) on the top face of camera 4. Preferably, the socket is coupled to the film advancing mechanism (not shown) in the camera so that it may be rotatably indexed in response to each film advance operation. For example, camera 4 may have a socket and film advance mechanism of the type generally available for use with percussive flashcubes, such as that described in U.S. Pat. No. 3,602,618. In this instance however, contrary to the rotatable flashcube, the magazine container 10 must be held in a fixed position with respect to the camera, while the drive shaft 24 and its depending mounting post 42 are permitted to rotate with the socket. Accordingly, the magazine is also provided with an adjustable post 44 (FIG. 5) depending from base 10b and adapted for engaging the edge of the camera when the magazine is mounted thereon.

Figure 6:
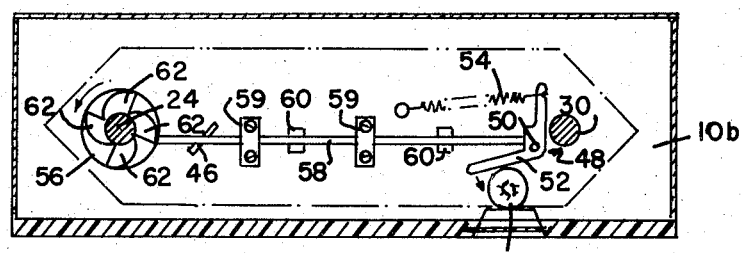
FIG. 6 is a simplified plan view of the firing mechanism of FIG. 5 with the sprocket wheels removed for clarity and only the lamp at the firing position being shown.
Figure 5:
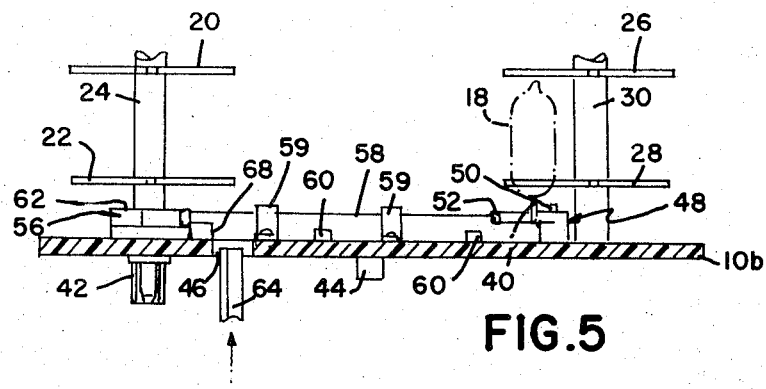
FIG. 5 is a simplified elevation, partly in section, of the interior mechanism of the magazine of FIG. 1, with the lamp at the firing position being shown in phantom.

Firing of a flashlamp located at the remote position behind window 12 is accomplished by release of a common preenergized striker means pivotally mounted near the firing position and normally held in a cocked condition by a latch accessible through an aperture 46 in base 10b near mounting post 42. Means is provided for cocking the striker after each release thereof, whereby the common striker may be successively released and recocked to successively fire each new flashlamp sequentially advanced to the firing position. In the embodiment of FIGS. 5 and 6, the common striker comprises a lever 48 pivotally mounted on base 10b by a pin 50 and having a striker arm 52 extending from the lever, as illustrated. The striker arm is vertically disposed to swing an arc parallel to base 10b between the upper surface of the base and sprocket wheel 28, whereby the arc of travel of the striker intersects the primer tube 40 of a lamp located at the firing position. Lever 48 is spring-loaded by an extension coil spring 54 to bias the striker arm 52 to swing counterclockwise, as viewed from above, for impacting against the above-mentioned primer tube.

The means for successively cocking the common striker includes a cammed disk 56 mounted on drive shaft 24 and vertically spaced below sprocket wheel 22. Accordingly, disk 56 is rotatably mounted on base 10b in common with the sprocket wheel drive shaft fixedly attached to the rotatable mounting post 42. Disposed between the cammed disk 56 and lever 48 in an actuating bar 58 which provides the striker latching function. Bar 58 is mounted on base 10b by strap springs 59 and guides 60 so as to be slidable along its axis and movable in an upward direction (as viewed in FIG. 5). Disk 56 has a plurality of cammed surfaces 62, and the upper left end of bar 58 bears against one of these surfaces when the bar is positioned flat on base 10b as shown.

Actuation of the latch arrangement to flash a lamp at the firing position is effected by a suitable actuating member 64 (FIG. 5) moving up through aperture 46 to engage and push the left end of bar 58 upwardly away from base 10b. Such actuation releases the upper end of the bar from the cammed disk 56, which in turn releases the spring-loaded lever 48. The released energy of spring 54 thereupon causes striker arm 52 to swing counterclockwise, as viewed from above, unitl it hits and indents the impact sensitive primer tube 40 at a high velocity to cause deflagration of the fulminating material located therein and thus ignite the combustible foil 38. In the typical application of FIG. 1, actuating member 64 may be part of a camera 4 mechanism, such as that described in U.S. Pat. No. 3,602,618 for use with percussive flashcubes, which is designed to enable a photographer to flash a lamp in synchronization with the tripping of the camera shutter to take a picture.

To illustrate overall operation, use of the described flash magazine will now be described with respect to a camera of the type described in U.S. Pat. No. 3,602,618. The photographer loads the camera 4 with a film cartridge and, by operating the film advancing lever (not shown), advances the film to the first frame or exposure. The flashlamp magazine 2 is then mounted on top of the camera. The camera mechanism of U.S. Pat. No. 3,602,618 is designed so that insertion of the mounting post 42 into its complementary receiving socket in the camera causes an upward movement of the actuating member 64 through aperture 46 to an intermediate position for sensing purposes. In the present application, as will be made clear hereinafter, a cocked firing mechanism indicates that a fresh, unused lamp is in the firing position. When the firing mechanism is cocked, the end of bar 58 overlies aperture 46. Hence, the upward sensing movement of member 64 continues until contact between member 64 and bar 58 restricts further movement. The camera is now ready for taking a picture. On the other hand, if the firing mechanism is uncocked, indicating a used lamp in the firing position, bar 58 will be in a raised position, and the unrestricted upward movement of member 64 will actuate an indicator signaling the presence of a used lamp.

When the shutter is actuated to effect an exposure, the camera mechanism synchronously actuates a further movement of member 64 to its maximum upward position. In traveling to this position, member 64 pushes bar 58 upward to release it from disk 56, which in turn releases the spring loaded striker 52 to fire a lamp at the firing position behind window 12.

To prepare for the next picture, the photographer needs only to operate the film advancing lever (not shown) in the usual manner. This not only advances the film in the film cartridge to the next frame, but it also advances the belt 32 in magazine 2 to carry a fresh lamp 18 into firing position in window 12. More specifically, operation of the film advance mechanism causes the camera socket and the attached mounting post 42 to be rotated by a quarter of a turn, which thereby results in a like common rotation of drive shaft 24, disk 56, and sprocket wheels 20 and 22. The moving sprocket wheels thereupon drive the endless belt 32 to translate this increment of rotation into an increment of longitudinal motion sufficient to sequentially advance one belt-carried flashlamp into firing position with its associated reflector segment 16 aligned with the stationary reflector segment 14 in window 12. At the same time the film and belt are indexed, the rotating cam surface 62 pushes bar 58 to the right, thereby forcing the bar against the spring-loaded lever 48 to pivot the lever, and thus the striker 52, clockwise, as viewed from above, and hold the lever and striker in a cocked condition, as shown in FIGS. 5 and 6. Disk 56 is inititally oriented so that the cam surface 62 permits a maximum leftward excursion of bar 58, and the cam surface is shaped to produce a maximum rightward excursion of the bar upon rotation of disk 56 by a quarter of a turn. As the rotating cam surface advances the bar 58 into the cocked position, the end of the bar is moved to overlie aperture 46 to be accessible to actuating member 64, and lever 48 is pivoted to deflect striker arm 52 away from a lamp 18, as that lamp is carried by the moving belt 32 into position for firing. Again, when the camera shutter is actuated to effect an exposure, actuating member 64 moves upward through aperture 46 to push bar 58 upwardly away from base 10b. Such actuation releases the upper end of the bar from the cammed disk 56, which in turn releases the spring-loaded lever 48. The released energy of spring 54 causes lever 48 to rotate counterclockwise, as viewed from above, and in so doing the released bar 58 is forced to the left until stopped by its lower end surface 68. More importantly, the released spring energy actuates striker 52 to fire a lamp at the firing position.

Upon again actuating the film advancing mechanism, the upper left end of bar 58 falls back into engagement with cam surface 62 as disk 56 begins to rotate. Hence, at the end of the quarter turn rotation of disk 56, bar 58 again cocks lever 48 in readiness for firing the fresh lamp which had been indexed to window 12 during the rotation cycle.

The foregoing operations may be repeated several times to take several flash pictures in rapid succession if desired. In the illustrated flash magazine, twelve lamps are available to be sequentially flashed in response to successive indexing. Accordingly, the magazine is particularly convenient for use with the commonly available twelve-exposure film cartridges.

Figure 7:
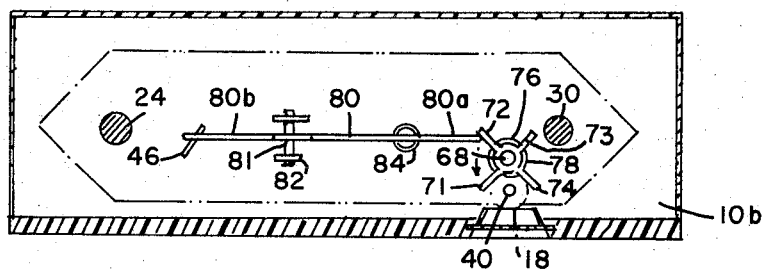
FIG. 7 is a simplified plan view of the magazine of FIG. 1 showing an alternative firing mechanism, the sprocket wheels being removed for clarity and only the lamp at the firing position being shown.
Figure 8:
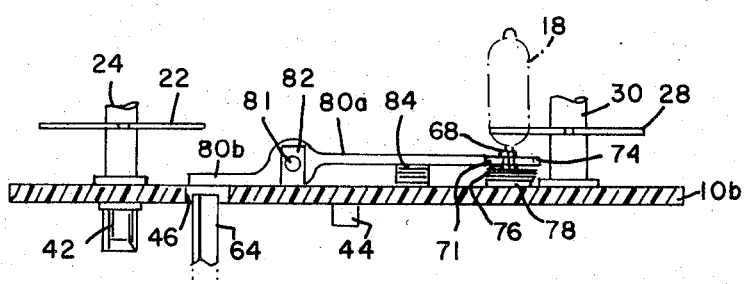
FIG. 8 is a simplified elevation, partly in section, of the magazine of FIG. 7 with the lower sprocket wheels included and the lamp at the firing position being shown in phantom.

When using the lamp firing mechanism of FIGS. 5 and 6, all energy for advancing the lamp belt 32 and cocking the common striker must be provided by the camera film advance mechanism via the rotating camera socket, mounting post 42 and shaft 24. Hence, operation of these magazines is dependent upon adequate stored energy in the camera mechanism. In many applications, however, it is desirable to substantially reduce the power required from the camera for operating the magazine. To accommodate such applications, FIGS. 7 and 8 illustrate a lamp firing mechanism having a common striker which is preenergized to both aid the lamp belt to index after lamp firing and to automatically assume a cocked condition after the belt is advanced. In this embodiment, the striker means comprises a spindle 68 rotatably mounted on base 10b near the firing position behind window 12 and having four striker arms 71–74 radially extending in a substantially symmetrical pattern. The striker arms are vertically disposed to swing arcs lying in a plane parallel to base 10b between the upper surface of the base and sprocket wheel 28, whereby the arc of travel of one of the strikers intersects the primer tube 40 of a lamp located at the firing position. The means for preenergizing, or cocking, the rotatable striker spindle comprises a flat spiral spring 76 mounted in a cylindrical cavity 78 in base 10b and connected to spindle 68 for spring-loading the spindle and striker arms to rotate counterclockwise, as viewed from above. The latching means comprises a lever 80 pivotally mounted by means of a pin 81 on a bracket 82 projecting from base 10b. Lever 80 has a first arm 80a which normally engages one of the striker arms to hold the striker spindle in a cocked condition; e.g., FIG. 7 shows lever arm 80a engaging striker arm 72. A second arm 80b is spring-loaded toward base 10b by a compression coil spring 84 positioned under arm 80a, with the end of arm 80b lying over aperture 46 and thus being accessible therethrough to be pushed upwardly by actuating member 64.

Accordingly, when the camera shutter is actuated to effect an exposure, actuating member 64 moves upward through aperture 46 to engage and push lever arm 80b upwardly away from the base 10b. This action pivots the lever to deflect arm 80a downward toward base 10b, thereby disengaging the lever from striker arm 72 and releasing the spring loaded spindle 68. The released energy of spiral spring 76 causes the striker arms to rotate counterclockwise, as viewed from above, until one of the arms (71 in FIGS. 7 and 8) hits and indents the impact sensitive primer tube 40 of a flashlamp at the firing position, thereby firing the lamp to take a flash picture. Thereafter, the spring loaded lever returns to its normal position ready to engage striker arm 73. Upon actuating the film advancing mechanism, the camera transmits a rotary motion via drive shaft 24 and sprocket wheels 20, 22 to advance belt 32 for moving a fresh lamp to the firing position. In this instance, however, the released but spring-loaded striker arm 71 is applying pressure against the primer tube of the used lamp which aids in advancing the lamp belt, thereby reducing the stored energy requirement of the camera film advance mechanism by the residual energy of spiral spring 76. At the same time, the belt advance operation permits the striker arms to again rotate until one of the arms (73 in the above example) engages the end of lever arm 80a to again hold the spindle in a cocked condition.

In the embodiment of FIGS. 7 and 8, a camera of the type described in U.S. Pat. No. 3,602,618 would have to be modified to remove the sensing operation, or the striker arms would be adapted to hold arm 80a down after firing so that the upward position of arm 80b permits the upward travel of member 64 to indicate a used lamp.

In lieu of using a belt as the lamp carrier means, each lamp and reflector segment could be mounted on a pallet, or platform, and a train of pallets could be pushed along an endless channel in base 10b or mounted on an endless chain driven by the sprocket wheels. It is also contemplated that in some applications, it may be desirable to use only a fixed reflector, and thereby provide a more compact package. That is, lamps having no reflector segments would be sequentially advanced to a position within a fixed reflector. Also, in lieu of a drive shaft 24 and mounting post 42, any other type of spindle means may be rotatably mounted on the base.

Accordingly, although the invention has been described with respect to specific embodiments, it will be appreciated that modifications and changes may be made by those skilled in the art without departing from the true spirit and scope of the invention.

What I claim is:

1. A photoflash assembly comprising, in combination:
   a base member;
   a plurality of percussively-ignitable flashlamps movably supported on said base member;
   means for controlling the path of travel of said movable flashlamps;
   means for moving said plurality of flashlamps along said controlled path of travel to advance said flashlamps sequentially to a firing position;
   preenergized striker means supported at a fixed position on said base member;
   latching means mounted on said base and normally holding said striker in a cocked condition;
   said photoflash assembly being receivable on a camera having means for firing one of said flashlamps, and the cocked arrangement of said latching means and said striker means being accessible to be actuated by said camera firing means for releasing said striker means to fire a flashlamp at said firing position;
   and means for cocking said striker means after release thereof, whereby said striker means may be successively released and recocked to successively fire each new flashlamp sequentially advanced to said firing position.

2. The assembly of claim 1 wherein: said means for controlling the path of travel comprises carrier means on said base movable longitudinally thereof; said plurality of flashlamps are mounted on said carrier means; and said means for moving said plurality of flashlamps comprises a spindle rotatably mounted on said base, and a mechanism on said base for translating a rotary motion of said spindle to a longitudinal motion by said carrier means.

3. The assembly of claim 1 wherein said means for controlling the path of travel comprises an endless belt movably supported on said base member, and said plurality of flashlamps are mounted on and carried by said belt.

4. The assembly of claim 3 wherein said means for moving said plurality of flashlamps comprises a set of sprocket wheels rotatably mounted on said base with the sprockets thereof engaging and supporting said belt.

5. The assembly of claim 4 wherein each of said flashlamps has a primer tube depending therefrom and projecting substantially below the lower edge of the belt on which said flashlamps are mounted, said belt being supported by said sprocket wheels so as to carry said flashlamps and primer tubes above and spaced away from the upper surface of said base.

6. The assembly of claim 4 wherein said belt has a plurality of spaced reflectors formed therein, each of said flashlamps being carried in a respective one of said reflectors.

7. The assembly of claim 6 wherein said base comprises one side of a closed container having a window in the front face thereof, said container enclosing said sprocket wheels and said plurality of flashlamps carried on said belt, said firing position being aligned with said window, and further including a stationary reflector segment disposed in said container at the front face thereof and aligned with the window therein so that it will in turn be aligned with each belt reflector as its associated flashlamp is moved into firing position to thereby provide a two segment reflector for each lamp in firing position.

8. The assembly of claim 7 wherein said assembly is receivable on a camera having a mechanical actuating member for firing one of said flashlamps, and said base has an aperture therethrough, said latching means being accessible through said aperture to be actuated by said actuating member and thereupon being operative to release said striker means to fire a flashlamp at said firing position.

9. The assembly of claim 8 wherein said window and the firing position aligned therewith are located such that when said assembly is mounted on a camera having a lens, said window and associated firing position are offset a predetermined distance from said lens for reducing the effect to "red-eye."

10. The assembly of claim 9 wherein the predetermined distance between the center of said lens and the center of a lamp at said firing position is at least about two and one-half inches.

11. The assembly of claim 1 wherein said assembly is receivable on a camera having a lens, and said firing position is located on said base such that when said assembly is mounted on said camera, said firing position is offset a predetermined distance from said lens for reducing the effect of "red-eye."

12. The assembly of claim 11 wherein the predetermined distance between the center of said lens and the center of a lamp at said firing position is at least about two and one-half inches.

13. The assembly of claim 1 wherein said assembly is receivable on a camera having a mechanical actuating member for firing one of said flashlamps, and said base has an aperture therethrough, said latching means being accessible through said aperture to be actuated by said actuating member and thereupon being operative to release said striker means to fire a flashlamp at said firing position.

14. The assembly of claim 13 wherein said firing position is located such that when said assembly is mounted on a camera having a lens, the center of a lamp at said firing position is offset from the center of said lens by at least 2½ inches.

15. The assembly of claim 13 wherein said striker means comprises a spring-loaded lever pivotally mounted on said base and having a striker arm operative upon release to impact against and fire a flashlamp at said firing position, said means for cocking said striker means includes a cammed disk having a rotatable drive shaft means which is indexably receivable in rotatable mounting means on a camera, and said latching means comprises a slidable bar disposed between said cammed disk and said spring-loaded lever, said camera having a film advancing mechanism coupled to said rotatable mounting means which is operative upon actuation to rotate said drive shaft and cammed disk whereby the rotary position of said cammed disk forces said bar against said spring-loaded lever to hold said lever in a cocked condition, the end of said bar adjacent said cammed disk being accessible through said aperture to be pushed away from said base by said actuating member, such actuation releasing said bar from said cammed disk to thereby release said spring-loaded lever.

16. The assembly of claim 15 wherein: said means for controlling the path of travel comprises carrier means on said base movable longitudinally thereof; said plurality of flashlamps are mounted on said carrier means; and said means for moving said plurality of flashlamps comprises a rotary member attached to said drive shaft means and operatively coupled to said carrier means for translating a rotary motion of said shaft means to a longitudinal motion by said carrier means.

17. The assembly of claim 13 wherein said striker means comprises a spindle rotatably mounted on said base and having a plurality of striker arms radially extending therefrom in a substantially symmetrical pattern, and said means for cocking said striker means comprises a flat spiral spring mounted on said base and connected to said spindle for spring-loading said spindle and the striker arms extending therefrom, said latching means normally engaging one of said striker arms to hold said spindle in a cocked condition and being operative upon actuation to release said spring-loaded spindle whereby said striker arms are allowed to rotate until one of said striker arms impacts against and fires a flashlamp at said firing position, subsequent advance of said flashlamps permitting said striker arms to again rotate until one of said striker arms engages said latching means to again hold said spindle in a cocked condition.

18. The assembly of claim 17 wherein said latching means comprises a lever pivotally mounted on said base and having a first arm normally engaging one of said striker arms and a second arm spring-loaded toward said base, said second arm being accessible through said aperture to be pushed away from said base by said actuating member, such actuation causing said first arm to deflect toward said base and thereby release said spring-loaded spindle, after which the spring-loaded lever returns to its normal position ready to engage another striker arm.

* * * * *